United States Patent
Wu et al.

(10) Patent No.: US 7,339,491 B2
(45) Date of Patent: Mar. 4, 2008

(54) LIGHT-EMITTING DIODE BACKLIGHT MODULE

(75) Inventors: Yi-Tsuo Wu, Jhonghe (TW); Robert Yeh, Yuanli Township, Miaoli County (TW)

(73) Assignee: Everlight Electronics Co., Ltd., Taipei Hsien (TW)

( * ) Notice: Subject to any disclaimer, the term of this patent is extended or adjusted under 35 U.S.C. 154(b) by 84 days.

(21) Appl. No.: 11/432,379

(22) Filed: May 12, 2006

(65) Prior Publication Data

US 2007/0165417 A1    Jul. 19, 2007

(30) Foreign Application Priority Data

Jan. 19, 2006    (TW) ............... 95102084 A

(51) Int. Cl.
*G08B 5/00* (2006.01)
(52) U.S. Cl. .............. 340/815.4; 340/815.49; 340/815.45; 340/815.5; 340/815.54; 340/815.75; 349/62; 349/63; 349/64
(58) Field of Classification Search ............ 340/815.4, 340/815.45, 815.49, 815.5, 815.54, 815.75, 340/815.76; 349/61, 62, 63, 64
See application file for complete search history.

(56) References Cited

U.S. PATENT DOCUMENTS

| | | | | |
|---|---|---|---|---|
| 5,883,684 A | * | 3/1999 | Millikan et al. | 349/65 |
| 5,949,187 A | * | 9/1999 | Xu et al. | 313/504 |
| 6,008,871 A | * | 12/1999 | Okumura | 349/61 |
| 6,018,419 A | * | 1/2000 | Cobb et al. | 359/500 |
| 6,060,727 A | * | 5/2000 | Shakuda | 257/90 |
| 6,132,072 A | * | 10/2000 | Turnbull et al. | 362/494 |
| 6,144,165 A | * | 11/2000 | Liedenbaum | 315/169.3 |
| 6,160,596 A | * | 12/2000 | Sylvester et al. | 349/61 |
| 6,196,691 B1 | * | 3/2001 | Ochiai | 362/617 |
| 6,229,508 B1 | * | 5/2001 | Kane | 345/82 |

\* cited by examiner

*Primary Examiner*—Daryl C Pope
(74) *Attorney, Agent, or Firm*—Birch, Stewart, Kolasch & Birch, LLP

(57) ABSTRACT

An LED backlight module includes a substrate. An LED array, composed of a plurality of red, blue and green lamp LEDs, is mounted on the substrate. A light-mixing chamber is mounted on the substrate and is used to seal the LED array inside. A diffusion sheet is secured inside the light-mixing chamber and is disposed parallel to the substrate. A first prism sheet is secured inside the light-mixing chamber and is disposed parallel to the diffusion sheet. A second prism sheet is secured inside the light-mixing chamber and is disposed parallel to the first prism sheet.

10 Claims, 2 Drawing Sheets

LIGHT-EMITTING DIODE BACKLIGHT MODULE

RELATED APPLICATIONS

The present application is based on, and claims priority from, Taiwan Application Serial Number 95102084, filed Jan. 19, 2006, the disclosure of which is hereby incorporated by reference herein in its entirety.

BACKGROUND

1. Field of Invention

The present invention relates to a backlight module for a display device. More particularly, the present invention relates to an LED backlight module for a display device.

2. Description of Related Art

Liquid crystal display (LCD) devices are widely used in cell phones, PDAs, and TVs. Conventional display devices use cold cathode light (CCL) bulbs as light sources, but contemporary display devices are beginning to use LEDs as light sources.

Conventional applications of LEDs as backlight sources comprise several methods. A typical method uses blue light from an InGaN LED chip filtered through yellow phosphorus to generate a cool-white or fluorescent light appearance. However, the brightness and color purity of InGaN-white LEDs depend on the amount of phosphorus coating, and it is difficult to provide both good brightness and color purity. Therefore, this method cannot provide a good quality light source to meet consumer demands for display devices.

SUMMARY

It is therefore an objective of the present invention to provide an LED backlight module for a display device.

In accordance with the foregoing and other objectives of the present invention, a backlight module includes a substrate. The substrate can be a printed circuit board. An LED array, composed of a plurality of red, blue and green lamp LEDs, is mounted on the substrate by DIP-type pins. The red, blue and green lamp LEDs are of a side-emitting LED, which is made of an LED chip packaged in a transparent resin body having a cavity on top. A light-mixing chamber is mounted on the substrate and is used to seal the LED array inside. A diffusion sheet is secured inside the light-mixing chamber and disposed parallel to the substrate. A first prism sheet is secured inside the light-mixing chamber and disposed parallel to the diffusion sheet. A second prism sheet is secured inside the light-mixing chamber and disposed parallel to the first prism sheet. Brightness and uniformity of white mixed-light emitted from the LED array is improved after passing through the diffusion sheet and the first and second prism sheet.

Thus, a backlight module made of an array of side-emitting lamp LEDs is disclosed so as to provide a low-cost design for a thin profile backlight module.

It is to be understood that both the foregoing general description and the following detailed description are by examples and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
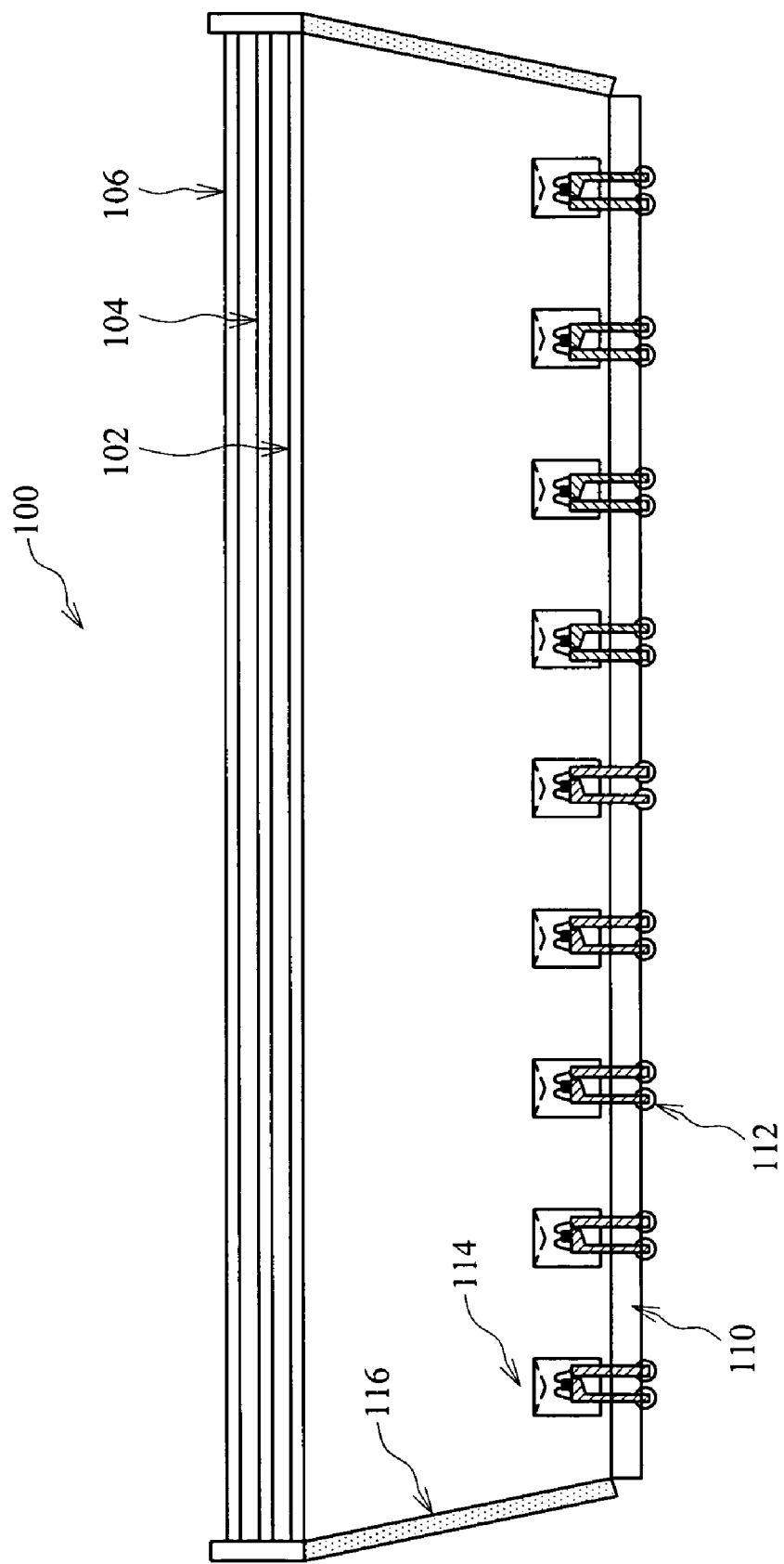
FIG. 1 illustrates a cross-sectional view of a backlight module according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

As described above, the present invention provides a backlight module including an array of lamp LEDs (light-emitting diodes) as its light source. Using low-cost lamp LEDs as a light source and side-emitting design, an LCD panel of high light saturation is provided.

FIG. 1 illustrates a cross-sectional view of a backlight module according to one preferred embodiment of this invention. A backlight module 100 includes a module substrate 110 and a light-mixing chamber. The module substrate 110 can be a printed circuit board for securing an LED array 114. Through holes are formed on the module substrate 110, DIP-type (dual in-line package) pins of the LED array 114 are subsequently inserted into through holes, and solder joints 112 are used to secure DIP-type pins to the module substrate 110. The light-mixing chamber is composed mainly of reflective walls 116, such as walls coated with metal film. The light-mixing chamber is mounted on the module substrate 110 and preferably seals the LED array 114 inside. A diffusion sheet 102 and two prism sheets 104 and 106 are all installed parallel to the module substrate 110. The diffusion sheet 102 is preferably installed nearer to the module substrate 110 than the prism sheets 104 and 106. Brightness and uniformity of light emitted from the LED array 114 are improved after passing through the diffusion sheet 102 and two prism sheets 104 and 106.

Figure 2:
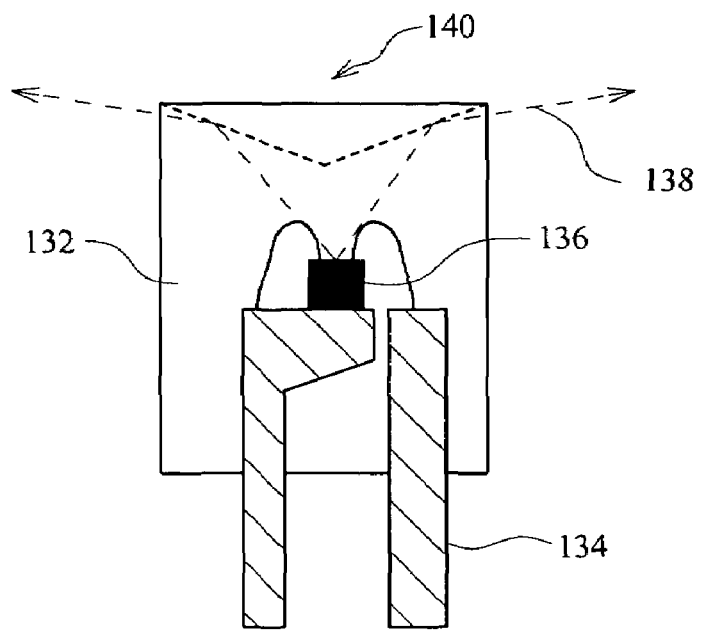
FIG. 2 illustrates a cross-sectional view of a lamp LED package according to one preferred embodiment of this invention.

FIG. 2 illustrates a cross-sectional view of a lamp LED package according to one preferred embodiment of this invention. In order to make a profile of the whole backlight module as thin as possible, the lamp LEDs are preferably designed as side-emitting LEDs. By forming a cavity 140 on top of each LED, the light path 138 (light emitted from an LED chip 136) is reflected by the surface of the cavity and turned towards the right side so as to mix light in a thinner light-mixing chamber. Such side-emitting lamp LEDs are made of an LED chip 136, which is bonded on top of DIP-type pins 134 and packaged in a transparent resin body 132, wherein a cavity 140 is formed on top of the transparent resin body 132.

Figure 3:
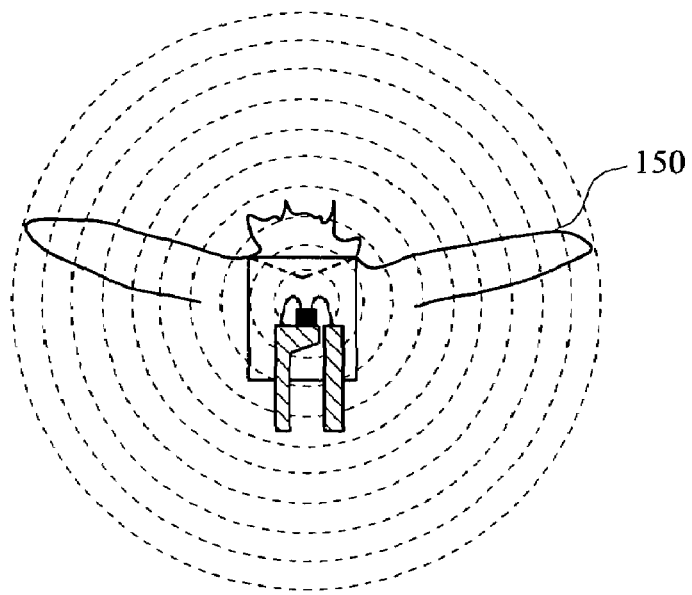
FIG. 3 illustrates a light-emitting strength distribution of a lamp LED package according to one preferred embodiment of this invention.

FIG. 3 illustrates a light-emitting strength distribution of a lamp LED package according to one preferred embodiment of this invention. Light-emitting strength distribution 150 of the lamp LED package in FIG. 2 shows that a large portion of emitted light is directed to the side, rather than to the top. By the side-emitting design of FIG. 2 and the backlight design of FIG. 1, red, green and blue light is mixed within a short distance to form a white light of high light saturation.

According to the preferred embodiments, the disclosed backlight module comprising an array of side-emitting lamp LEDs provides a low-cost design for a thin profile backlight module.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module, comprising:
   a substrate;
   an LED array, including a plurality of red, blue and green lamp LEDs mounted on the substrate;
   a light-mixing chamber, mounted on the substrate and sealing the LED array inside;
   a diffusion sheet, secured inside the light-mixing chamber and disposed parallel to the substrate;
   a first prism sheet, secured inside the light-mixing chamber and disposed parallel to the diffusion sheet; and
   a second prism sheet, secured inside the light-mixing chamber and disposed parallel to the first prism sheet, whereby brightness and uniformity of white mixed-light emitted from the LED array is improved after passing through the diffusion sheet and the first and second prism sheet.

2. The backlight module of claim 1, wherein the light-mixing chamber includes a reflective wall.

3. The backlight module of claim 1, wherein the red, blue and green lamp LEDs are side-emitting LEDs.

4. The backlight module of claim 3, wherein each side-emitting LED is a lamp LED made of an LED chip packaged in a transparent resin body having a cavity on top.

5. The backlight module of claim 1, wherein the substrate is a printed circuit board.

6. A backlight module, comprising:
   a substrate;
   an LED array, including a plurality of red, blue and green lamp LEDs having DIP-type pins mounted on the substrate;
   a light-mixing chamber, mounted on the substrate and sealing the LED array inside;
   a diffusion sheet, secured inside the light-mixing chamber and disposed parallel to the substrate;
   a first prism sheet, secured inside the light-mixing chamber and disposed parallel to the diffusion sheet; and
   a second prism sheet, secured inside the light-mixing chamber and disposed parallel to the first prism sheet, whereby brightness and uniformity of light emitted from the LED array is improved after passing through the diffusion sheet and the first and second prism sheet.

7. The backlight module of claim 6, wherein the light-mixing chamber includes a reflective wall.

8. The backlight module of claim 6, wherein the red, blue and green lamp LEDs are side-emitting LEDs.

9. The backlight module of claim 8, wherein the side-emitting LED is a lamp LED made of an LED chip packaged in a transparent resin body having a cavity on top.

10. The backlight module of claim 6, wherein the substrate is a printed circuit board.

* * * * *